(12) United States Patent
Sung (10) Patent No.: US 8,308,625 B2
(45) Date of Patent: Nov. 13, 2012

(54) APPARATUS CONFIGURED TO MANUFACTURE A ROLL OF INTERLEAVED BAGS

(75) Inventor: Lung Tsung Sung, Kaohsiung (TW)

(73) Assignee: IPS Industries, Inc., Cerritos, CA (US)

( * ) Notice: Subject to any disclaimer, the term of this patent is extended or adjusted under 35 U.S.C. 154(b) by 437 days.

(21) Appl. No.: 12/541,956

(22) Filed: Aug. 16, 2009

(65) Prior Publication Data

US 2011/0039675 A1    Feb. 17, 2011

(51) Int. Cl.
*B31B 49/04* (2006.01)

(52) U.S. Cl. .................... 493/194; 493/180; 493/201

(58) Field of Classification Search ............ 493/194, 493/206, 180, 196, 198, 199, 201, 223, 227
See application file for complete search history.

(56) References Cited

U.S. PATENT DOCUMENTS

| | | | |
|---|---|---|---|
| 3,308,722 A * | 3/1967 | Peterson Jack C | 493/187 |
| 3,473,995 A | 10/1969 | Schott | |
| 3,802,308 A * | 4/1974 | Davis, Jr. | 83/99 |
| 4,019,947 A | 4/1977 | Stock et al. | |
| 4,034,928 A | 7/1977 | McDonald et al. | |
| 4,386,924 A | 6/1983 | Crawford et al. | |
| 4,630,429 A * | 12/1986 | Christine | 53/479 |
| 4,642,084 A | 2/1987 | Gietman, Jr. | |
| 4,667,890 A | 5/1987 | Gietman, Jr. | |
| 4,695,005 A | 9/1987 | Gietman, Jr. | |
| 4,820,251 A * | 4/1989 | Blaser | 493/1 |
| 4,850,944 A * | 7/1989 | Osborn | 493/5 |
| 4,889,522 A | 12/1989 | Gietman, Jr. | |
| 4,934,993 A | 6/1990 | Gietman, Jr. | |
| 5,001,956 A * | 3/1991 | Nitsch | 83/620 |
| 5,015,223 A * | 5/1991 | Boeckmann | 493/194 |
| 5,019,027 A * | 5/1991 | Boeckmann et al. | 493/209 |
| 5,176,610 A | 1/1993 | Gietman, Jr. | |
| 5,284,002 A * | 2/1994 | Fowler et al. | 53/412 |
| 5,362,013 A | 11/1994 | Gietman, Jr. et al. | |
| 5,377,929 A | 1/1995 | Gietman, Jr. et al. | |
| 5,390,875 A | 2/1995 | Gietman, Jr. et al. | |
| 5,488,480 A | 1/1996 | Saindon et al. | |
| 5,518,559 A | 5/1996 | Saindon et al. | |
| 5,587,032 A | 12/1996 | Saindon et al. | |
| 5,660,674 A | 8/1997 | Saindon et al. | |
| 5,673,534 A * | 10/1997 | Fowler | 53/133.4 |
| 5,701,180 A | 12/1997 | Saindon et al. | |
| 5,797,828 A | 8/1998 | Selle et al. | |
| 5,857,953 A | 1/1999 | Selle et al. | |
| 5,861,078 A | 1/1999 | Huben et al. | |

(Continued)

FOREIGN PATENT DOCUMENTS

WO    96/15039    5/1996

*Primary Examiner* — Sameh H. Tawfik (74) *Attorney, Agent, or Firm* — Law Office of Steven R. Olsen, PLLC; Steven R. Olsen (57) ABSTRACT

In an embodiment of the invention, a cut/weld apparatus is configured to provide optimal and limited tension of bag material even during high-speed operation. The limited tension may contribute to stronger plastic welds. Another embodiment of the invention, which may be used in combination with the first embodiment, provides a roll discharge stage in a bag manufacturing apparatus that includes a retracting spindle and may include a rotating tray. The improved discharge stage requires less floor space than conventional side-discharge manufacturing equipment.

3 Claims, 9 Drawing Sheets

U.S. PATENT DOCUMENTS

| | | | |
|---|---|---|---|
| 5,899,403 A | 5/1999 | Gietman, Jr. et al. | |
| 5,934,534 A | 8/1999 | Schmidt et al. | |
| 5,961,020 A | 10/1999 | Schmidt et al. | |
| 5,964,389 A | 10/1999 | Schmidt et al. | |
| 5,979,729 A | 11/1999 | Schmidt et al. | |
| 6,117,058 A | 9/2000 | Sauder et al. | |
| 6,186,436 B1 | 2/2001 | Selle et al. | |
| 6,381,919 B2 * | 5/2002 | Todd et al. | 53/64 |
| 6,481,183 B1 | 11/2002 | Schmidt | |
| 6,519,922 B1 | 2/2003 | Matheyka et al. | |
| 6,719,679 B1 * | 4/2004 | Lin | 493/238 |
| 6,746,389 B2 | 6/2004 | Selle et al. | |
| 6,792,807 B2 | 9/2004 | Binder et al. | |
| 6,817,160 B2 | 11/2004 | Schmidt | |
| 6,820,392 B2 | 11/2004 | Matheyka et al. | |
| 6,889,481 B2 | 5/2005 | Helwig et al. | |
| 6,976,946 B2 | 12/2005 | Wied et al. | |
| 7,191,575 B2 | 3/2007 | Frievalt et al. | |
| 7,213,384 B2 | 5/2007 | Matheyka et al. | |
| 7,275,354 B2 | 10/2007 | Frievalt et al. | |
| 7,326,162 B2 | 2/2008 | Sauder et al. | |
| 7,963,898 B2 * | 6/2011 | Tan | 493/194 |
| 2002/0030135 A1 | 3/2002 | Bartels et al. | |

* cited by examiner

APPARATUS CONFIGURED TO MANUFACTURE A ROLL OF INTERLEAVED BAGS

BACKGROUND

1. Field of the Invention

The invention relates generally to plastic bags, and more particularly, but without limitation, to an apparatus and method for manufacturing a roll of interleaved bags.

2. Description of the Related Art

Plastic bags are packaged in a variety of configurations. Some packaging variations relate to how the bags are dispensed. For instance, in one known configuration, plastic kitchen garbage bags, shopping bags, or other bags are pre-packaged in a roll of pre-cut (separated) bags. Bags within the roll are interleaved prior to rolling such that each bag partially overlaps another.

Plastic bag manufacturing is increasingly cost competitive. This is true for rolls of interleaved bags as well as for other bag configurations.

One known way to decrease manufacturing cost is to increase the speed of bag manufacturing. This is advantageous because fixed labor costs associated with machine operation can be spread over a higher number of products. Higher-speed bag manufacturing equipment is therefore needed.

Facilities are a component of overhead expense. Accordingly, another known way to decrease manufacturing cost is to improve the utilization of factory floor space. Manufacturing equipment features that improve floor space efficiencies are therefore highly desirable.

SUMMARY OF THE INVENTION

Embodiments of the invention seek to address one or more of the cost reduction opportunities described above. In an embodiment of the invention, a cut/weld apparatus is configured to provide optimal and limited tension of bag material even during high-speed operation. The limited tension may contribute to stronger plastic welds. Another embodiment of the invention, which may be used in combination with the first embodiment, provides a roll discharge stage in a bag manufacturing apparatus that includes a retracting spindle and may include a rotating tray. The improved discharge stage requires less floor space than conventional side-discharge manufacturing equipment.

More specifically, one embodiment of the invention provides a method for manufacturing bags. The method includes: receiving a tube of film; folding the tube of film to produce folded film; welding one end of the folded film; cutting the folded film to produce a folded bag; interleaving a plurality of folded bags to produce a plurality of interleaved bags; and accumulating the plurality of interleaved bags on a retractable spindle to produce a roll of interleaved bags.

Another embodiment of the invention provides a bag manufacturing apparatus. The bag manufacturing apparatus includes a first module, the first module including a first spindle configured to accumulate a plurality of interleaved bags thereon to produce a first roll of interleaved bags during a first accumulation mode, the first spindle further configured to retract from the first roll of interleaved bags along a long axis of the first spindle during a first spindle retraction mode.

BRIEF DESCRIPTION OF THE DRAWINGS

The invention will be more fully understood from the detailed description below and the accompanying drawings, wherein:

FIGS. 1A through 10F are sequential plan views of a roll accumulation and discharge station, according to an embodiment of the invention;

DETAILED DESCRIPTION

The invention will now be described more fully with reference to FIGS. 1-11B, in which embodiments of the invention are shown. This invention may, however, be embodied in many different forms and should not be construed as limited to the embodiments set forth herein. In the drawings, reference designators may be duplicated for the same or similar features. The figures are not drawn to scale; some features may be exaggerated for clarity.

Figure 1:
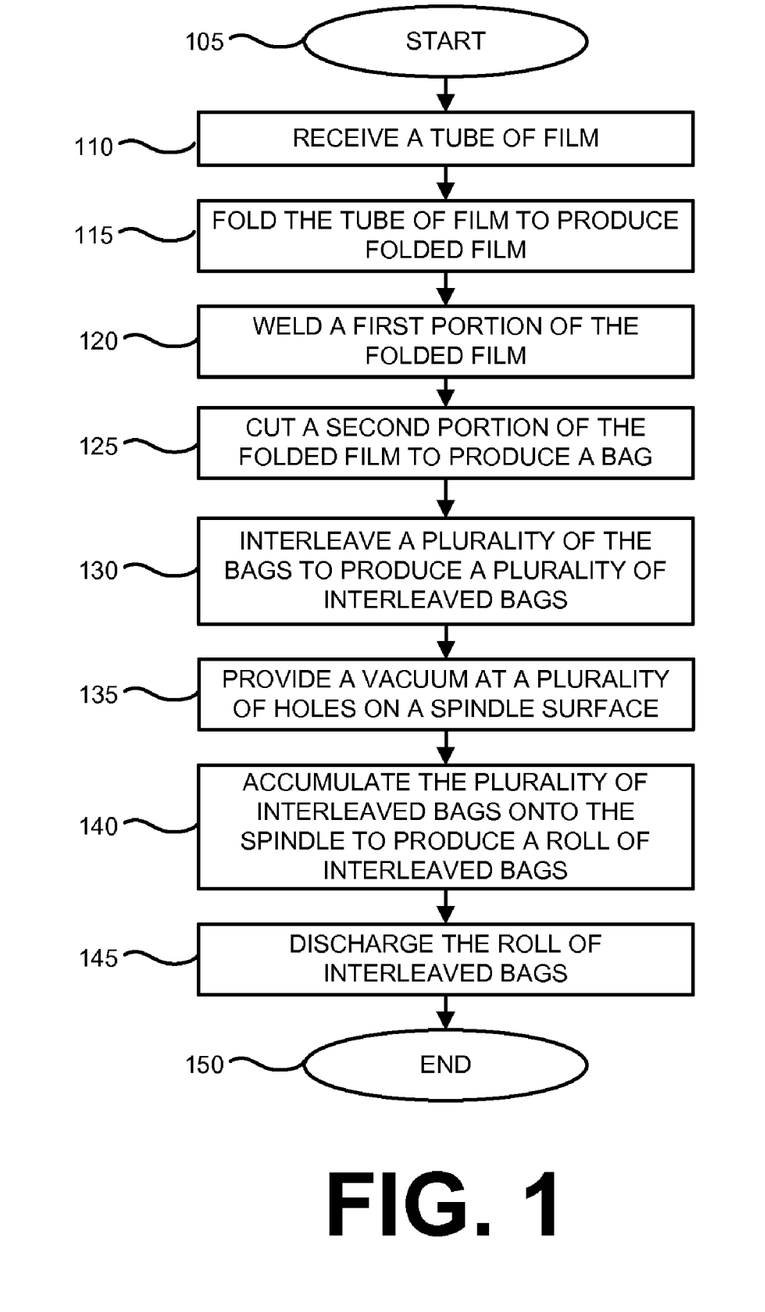
FIG. 1 is a flow diagram of a bag manufacturing process, according to an embodiment of the invention.

FIG. 1 is a flow diagram of a bag manufacturing process, according to an embodiment of the invention. As shown therein, the process begins in step 105. Then, the process receives a tube of film in step 110 and folds the tube of film to produce folded film in step 115. In step 120, the process welds a first portion of the folded film. The process cuts a second portion of the folded film to produce a bag in step 125. Next, in step 130, the process interleaves a plurality of the bags to produce a plurality of interleaved bags. In step 135, the process provides a vacuum at a plurality of holes on a spindle surface. Then, in step 140, the process accumulates the plurality of interleaved bags onto the spindle to produce a roll of interleaved bags. The process discharges the roll of interleaved bags in step 145 and terminates in step 150.

Variations to the process illustrated in FIG. 1 are possible. For example, step 115 may be omitted, according to design choice. In such an instance, the process would operate on the tube of film. In an alternative embodiment, the order of steps 120 and 125 may be reversed. Moreover, in embodiments of the invention, steps 120 and 125 may be performed together. For example, a top of one bag may be cut at the same time a bottom of another bag is sealed.

FIGS. 2-6 below illustrate the configuration of a tube of film during the folding step 115, according to an embodiment of the invention.

Figure 2:
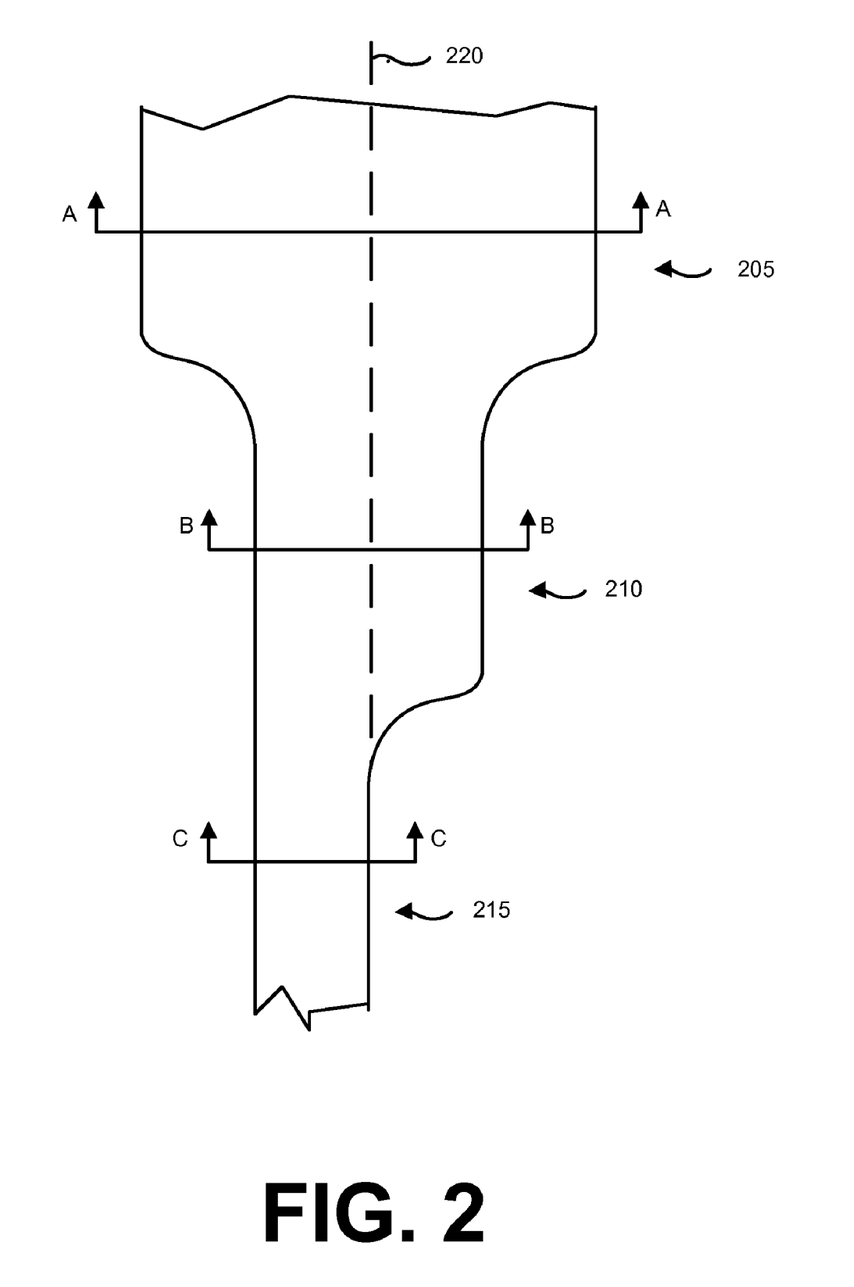
FIG. 2 is a plan view of a formed plastic material, according to an embodiment of the invention.
Figure 3:
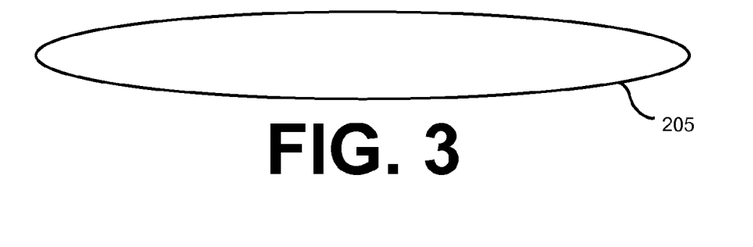
FIG. 3 is a cross-sectional view of a tubular portion along plane A-A in FIG. 2, according to an embodiment of the invention.
Figure 4:
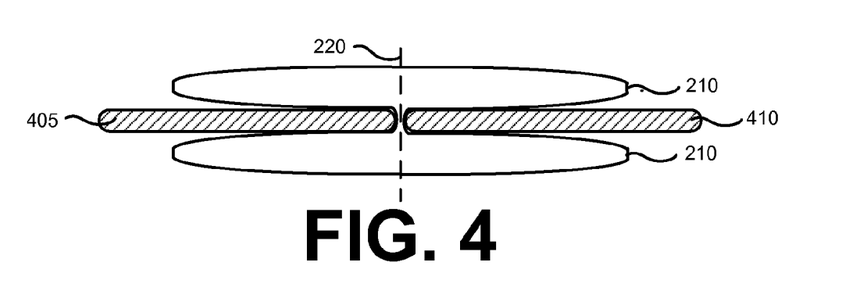
FIG. 4 is a cross-sectional view of a gusset forming tool, according to an embodiment of the invention.
Figure 5:
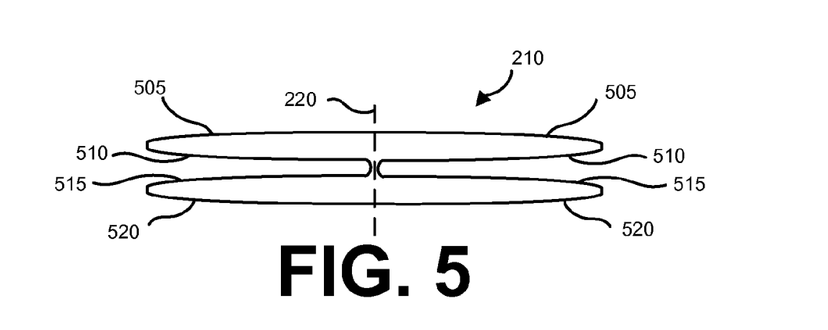
FIG. 5 is a cross-sectional view of a gusseted portion along plane B-B in FIG. 2, according to an embodiment of the invention.

FIG. 2 is a plan view of a formed plastic material, according to an embodiment of the invention. FIG. 2 illustrates the progression of formed plastic film (sometimes referred to as a web) in a bag manufacturing process. In sequence, FIG. 2 shows a tubular portion 205, a gusseted or 4-layered portion 210, and a folded or 8-layered portion 215. The tubular portion 205 may be as received in step 110. The gusseted or 4-layered portion 210 or the 8-layered portion 215 may be as output from step 115. FIGS. 3, 4, and 5 provide cross sectional views of the tubular portion 205, 4-layered portion 210 and 8-layered portion 215, respectively.

FIG. 3 is a cross-sectional view of the tubular portion 205 along plane A-A in FIG. 2, according to an embodiment of the invention. The tubular portion 205 may be, for example, several inches or several feet in diameter, according to application demands.

FIG. 4 is a cross-sectional view of a gusset forming tool, according to an embodiment of the invention; FIG. 5 is a cross-sectional view of the gusseted portion 210 along plane B-B in FIG. 2, according to an embodiment of the invention. As shown in FIG. 4, the tubular portion 205 may be deformed using gusset forming tools 405 and 410. In the illustrated embodiment, the gusseting tools 405 and 410 substantially meet along a center line 220 of the 4-layered portion 210. The gusseting tools 405 and 410 may be, for instance, constructed of wood or other thermal insulator. The resulting structure of the 4-layered portion 210 is shown in FIG. 5. As illustrated therein, except at the center line 220, the 4-layered portion 210 includes a first, second, third, and fourth layer 505, 510, 515, and 520, respectively. Layers 510 and 515 are the gusset layers.

Figure 6:
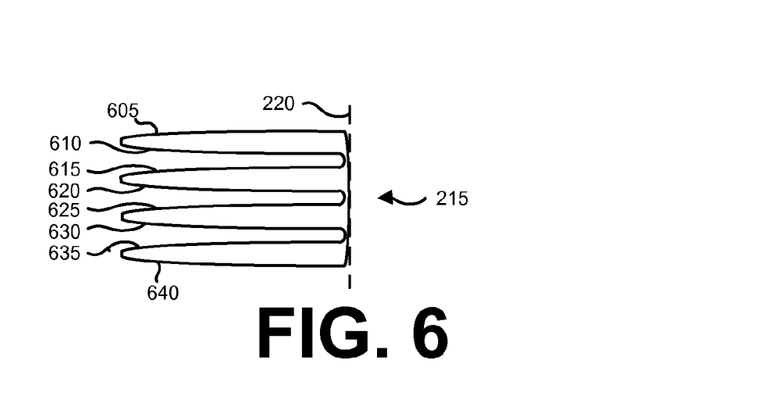
FIG. 6 is a cross-sectional view of a folded portion along plane C-C in FIG. 2, according to an embodiment of the invention.

FIG. 6 is a cross-sectional view of the folded portion 215 along plane C-C in FIG. 2, according to an embodiment of the invention. The 8-layered portion 215 is formed by folding the 4-layered portion 210 onto itself. The center line 220 is the fold line. The resulting 8-layered structure 215 includes first, second, third, fourth, fifth, sixth, seventh, and eighth layers 605, 610, 615, 620, 625, 630, 635, and 640, respectively.

Figure 7A:
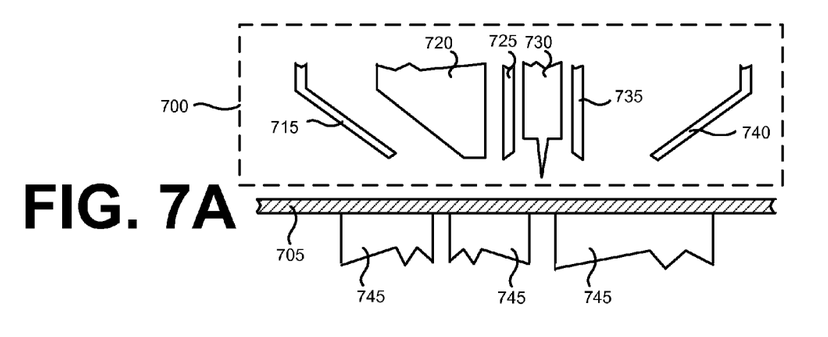
FIG. 7A is a cross-sectional elevation view of a die set in a first position, according to an embodiment of the invention.
Figure 7B:
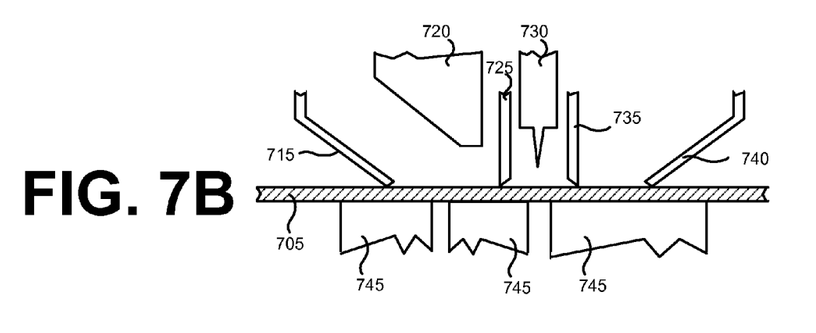
FIG. 7B is a cross-sectional elevation view of a die set in a second position, according to an embodiment of the invention.
Figure 7C:
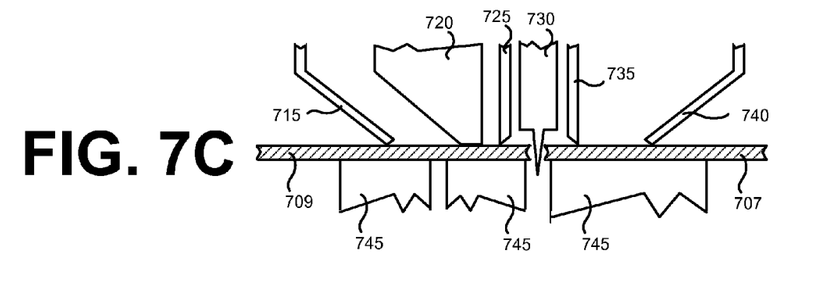
FIG. 7C is a cross-sectional elevation view of a die set in a third position, according to an embodiment of the invention.

FIGS. 7A-7C illustrate a die set than can be used, for instance, in executing welding step 120 and cutting step 125.

FIG. 7A is a cross-sectional elevation view of a die set in a first position, according to an embodiment of the invention. As shown therein, a web 705 is disposed between an upper die set 700 and a lower die set 745. The upper die set 700 includes outer-holding knives 715 and 740, inner-holding knives 725 and 735, heating tip 720, and cutting knife 730. As illustrated in FIG. 7A, the web 705 may be positioned, for instance by a conveyer, between the upper die set 700 and the lower die set 745.

FIG. 7B is a cross-sectional elevation view of a die set in a second position, according to an embodiment of the invention. As shown therein, in the second position, the outer-holding knives 715 and 740, and the inner-holding knives 725 and 735 are disposed in a lower position to secure the web 705 with limited tension prior to welding step 120 and cutting step 125.

FIG. 7C is a cross-sectional elevation view of a die set in a third position, according to an embodiment of the invention. As shown therein, the outer-knives 715 and 740 and inner-holding knives 725 and 735 remain in the lower position to secure the web 705. Additionally, the cutting knife 730 and the heating tip 720 are disposed in a lower position. In operation, the cutting knife 730 separates the web 705 into webs 707 and 709 in cutting step 125. The outer-holding knife 715 and the inner holding knife 725 secure the web 709 as the heating tip 720 seals a portion of the web 709 during welding step 120.

The outer holding knives 715 and 740, and the inner holding knives 725 and 735, may enable optimal and limited tension on the web 705 even during high-speed operation. Limited tension can be beneficial during welding step 120 because it produces a more robust plastic weld than one formed under a relatively higher degree of tension.

Variations to the configurations illustrated in FIGS. 7A-7C are possible. For instance, in an alternative embodiment, a portion of the lower die 745 that is opposite the heating tip 720 may be heated and may also move in a vertical plane so that it only contacts the web 705 (709) during the welding step 120.

Figure 8:
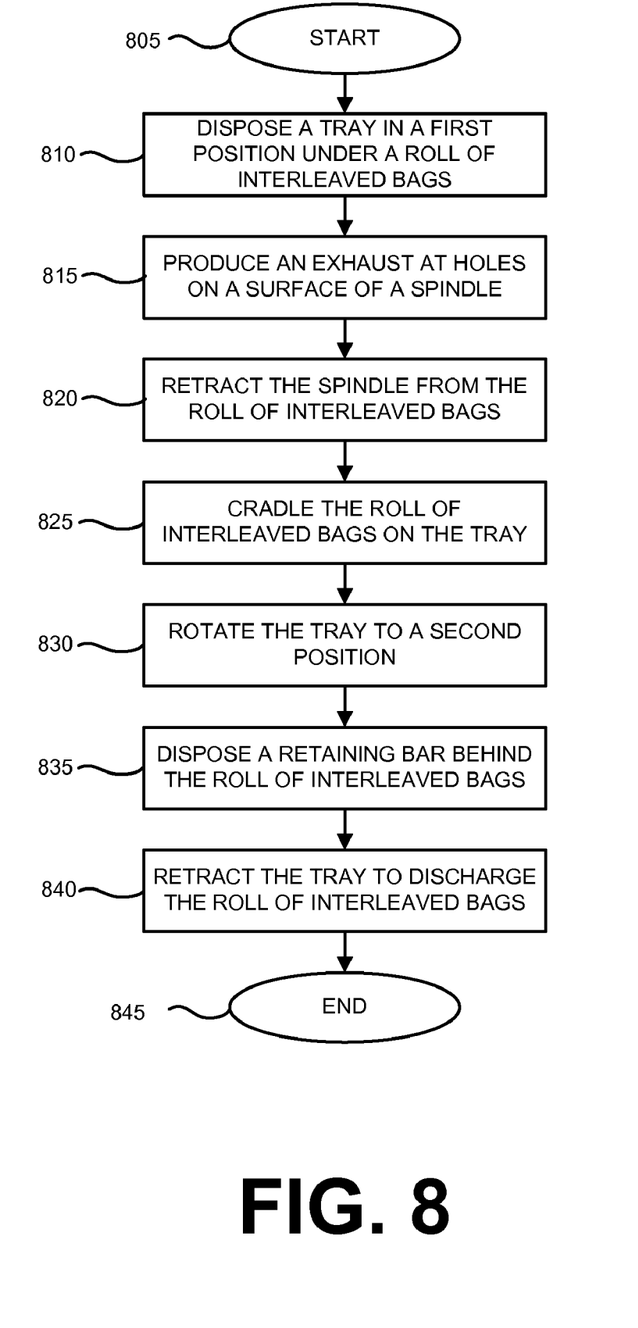
FIG. 8 is a flow diagram of a bag manufacturing process, according to an embodiment of the invention.

FIG. 8 is a flow diagram of a bag manufacturing process, according to an embodiment of the invention. FIG. 8 illustrates a process for performing the discharge step 145, according to one embodiment of the invention. As shown in FIG. 8, the process begins in step 805, and then disposes a tray in a first position under the roll of interleaved bags in step 810. The process then produces an exhaust at multiple holes on a surface of a spindle in step 815. Next, in step 820, with continued exhaust from the spindle, the process retracts the spindle from the roll of interleaved bags. The process cradles the roll of interleaved bags on a tray in step 825, and then rotates the tray to a second (discharge) position in step 830. In step 835, the process disposes a retaining bar behind the roll of interleaved bags. The process then retracts the tray in step 845, which discharges the roll of interleaved bags. The process terminates in step 850.

Variations to the process illustrated in FIG. 8 are possible. For instance step 810 could include producing an exhaust at a single elongated hole in the spindle, instead of at multiple holes in the spindle. Alternatively, step 810 could be omitted. FIGS. 9A-9F, 10A-10F, 11A, 11B, 12A, and 12B illustrate components of an apparatus that can be used in executing the accumulation step 140 and/or the discharge step 145.

FIGS. 9A through 9F are sequential elevation views of a roll accumulation and discharge station, according to an embodiment of the invention. The sequence illustrated in FIGS. 9A through 9F may be consistent with the process flow illustrated in FIG. 8. For clarity, only selected components of an accumulation and discharge station are illustrated.

Figure 9A:
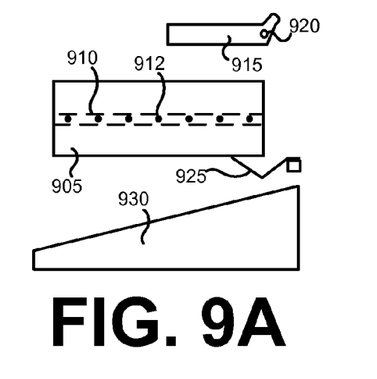
FIGS. 9A through 9F are sequential elevation views of a roll accumulation and discharge station, according to an embodiment of the invention.

FIG. 9A illustrates that a roll of bags 905 has accumulated on a spindle 910. The spindle 910 includes multiple holes 912. FIG. 9A further illustrates a retaining arm 915 having a pivot point 920. In FIG. 9A, the retaining arm 915 is not in a retention position. FIG. 9A further illustrates an end view of a tray 925 and an elevation view of a discharge ramp 930. FIG. 9A may thus illustrate an apparatus configuration associated with the accumulation step 140.

Figure 9B:
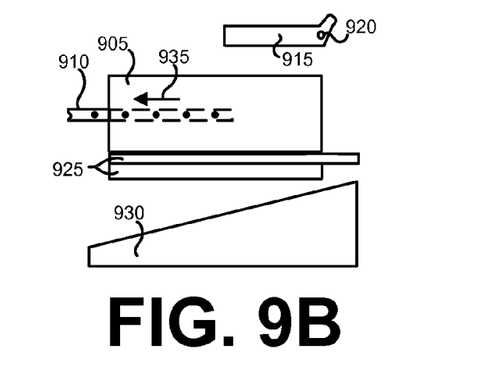

FIG. 9B illustrates the apparatus configuration during process steps 810, 815, and 820. As shown therein, the spindle 910 has begun to retract in a direction 935. In addition, the tray 925 is disposed to support the roll of bags 905. In one embodiment, the apparatus is configured so that the roll of bags 905 falls onto the tray 925 once the spindle 910 has fully retracted. In another embodiment, the apparatus is configured so that the tray 925 also supports the roll of bags 905 while the spindle 910 is being retracted.

Figure 9C:
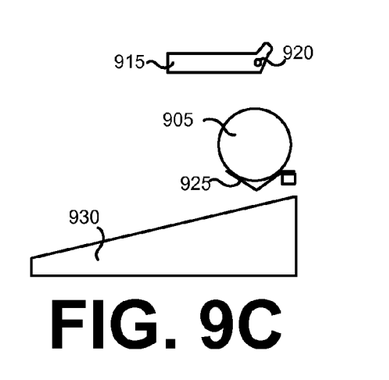

FIG. 9C illustrates the apparatus configuration upon completion of step 830, for instance. As shown in FIG. 9C, the tray 925 fully supports the roll of bags 905 and has rotated 90 degrees as compared to the position illustrated in FIG. 9B. In FIG. 9C, the roll of bags 905 and tray 925 are in a discharge position.

Figure 9D:
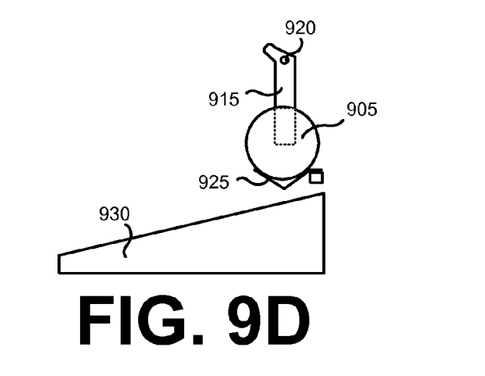

FIG. 9D illustrates the apparatus configuration upon completion of step 835. As shown therein, the retaining bar 915 has rotated about the pivot point 920 to retain the roll of bags 905.

Figure 9E:
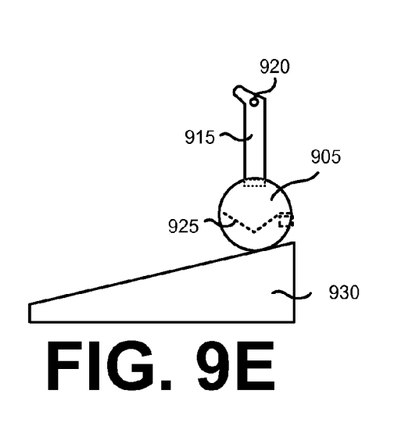

FIG. 9E illustrates the apparatus configuration upon completion of step 840. In FIG. 9E, the tray 925 has retracted (into the page) from the discharge position. The roll of bags 905 has dropped to contact the discharge ramp 930.

Figure 9F:
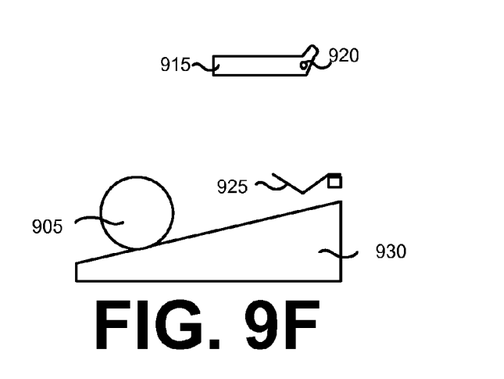

FIG. 9F illustrates the apparatus configuration at or near the conclusion of step 845. As shown in FIG. 9F, the retaining bar 915 has rotated about the pivot point 920 away from a retaining position. Accordingly, the roll of bags 905 is free to follow the slope of the discharge ramp 930.

Variations to the apparatus illustrated in FIGS. 9A-9F are possible. For instance, in an alternative embodiment, the discharge ramp 930 could be replaced by a collection bin.

Figure 10A:
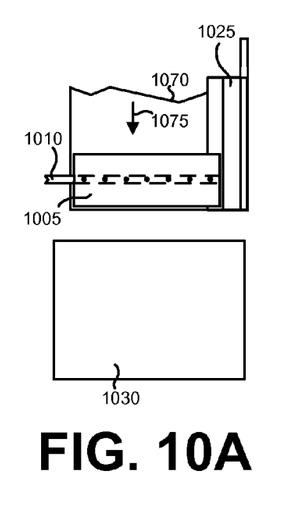

FIGS. 10A through 10F are sequential plan views of a roll accumulation and discharge station, according to an embodiment of the invention. The station illustrated in FIG. 10A illustrates the relative positions of a roll of bags 1005, spindle 1010, a tray 1025, a discharge ramp 1030, and a conveyor 1070 that is configured to move in a direction 1075. The station in FIG. 10A illustrates relative component positions during accumulation step 140, for instance.

Figure 10B:
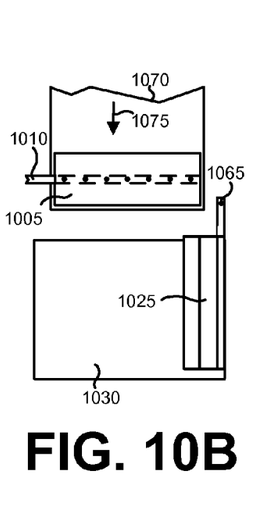
Figure 10C:
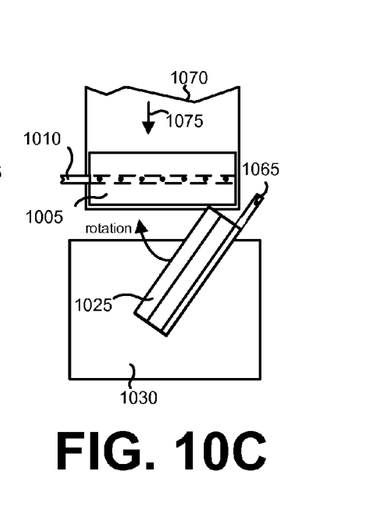
Figure 10D:
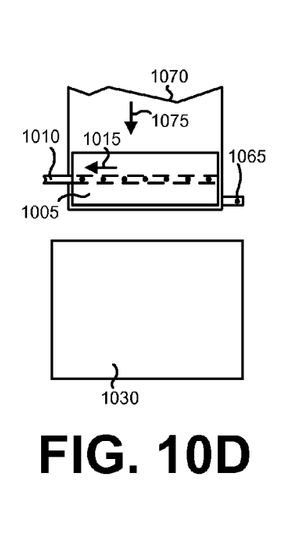

Upon completion of the accumulation step 140, the tray 1025 may first extend as illustrated in FIG. 10B, and rotate in a clockwise direction about pivot point 1065 as illustrated in FIG. 10C, until the tray 1025 is disposed under the roll of bags 1005 as illustrated in FIG. 10D. Together, FIGS. 10B, 10C, and 10D illustrate sequential operations of an accumulation and discharge station during process step 810.

FIG. 10D also illustrates the relative positions of components of an accumulation and discharge station during process steps 815, 820, and 825, except of course that the spindle 1010 is retracted in process step 820.

Figure 10E:
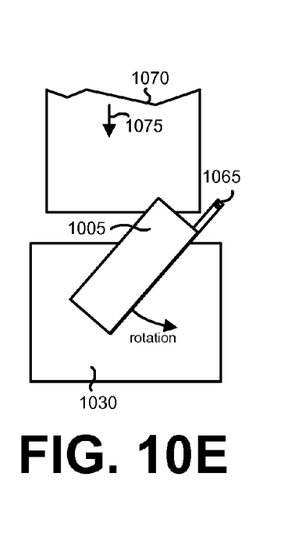

FIG. 10E illustrates that, during the execution of process step 830, the roll of bags 1005 is rotated to a second position by the tray 1025. As shown, the tray 1025 may be rotated in a counter-clockwise direction about the pivot point 1065.

Figure 10F:
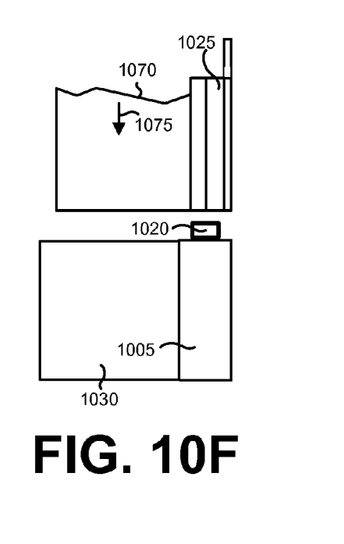

FIG. 10F illustrates the relative position of components at the conclusion of step 840. The retaining bar 1020 is disposed at one end of the roll of bags 1005 in process step 835. The tray 1025 is retracted into the illustrated position in process step 840. At the conclusion of process step 840, the roll of bags 1005 has been discharged onto the discharge ramp 1030.

Figure 11A:
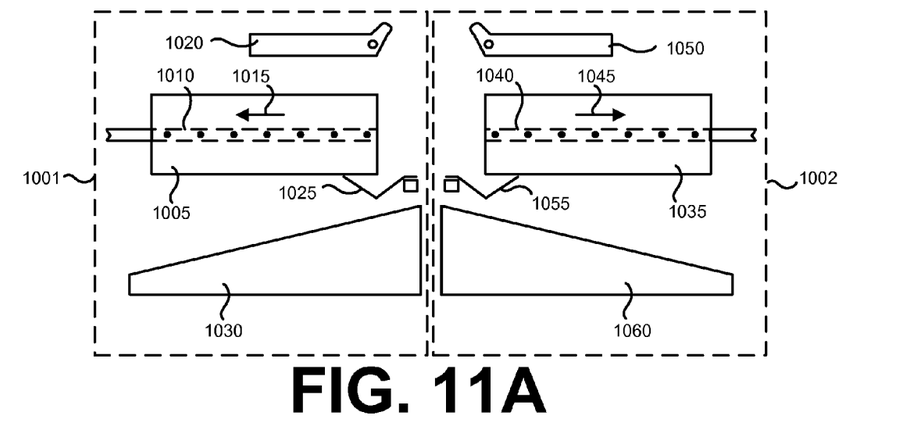
FIG. 11A is an elevation view of a dual accumulation and discharge station, according to an embodiment of the invention.

FIG. 11A is an elevation view of a dual accumulation and discharge station, according to an embodiment of the invention. As shown therein, a dual accumulation and discharge station services two bag manufacturing lines. For instance, one line is serviced by the first accumulation and discharge station 1001; a second line is serviced by a second accumulation and discharge station 1002.

The first accumulation and discharge station 1001 includes a spindle 1010 configured to accumulate a roll of bags 1005. The spindle 1010 is further configured to move in a direction 1015. FIG. 11A also illustrates that a retaining arm 1020 is disposed in a non-retaining position and that a tray 1025 is disposed over a discharge ramp 1030. The second accumulation and discharge station 1002 includes a spindle 1040 configured to accumulate a roll of bags 1035. The spindle 1040 is configured to move in a direction 1045. The direction 1045 is opposite the direction 1015. The second discharge station 1002 also includes a retaining arm 1050, a tray 1055, and a discharge ramp 1060.

An advantage of the configuration illustrated in FIG. 11A is that two bag manufacturing lines can be disposed next to each other. Such a configuration is enabled by the retractable spindles 1010 and 1040 and by the rotating trays 1025 and 1055 that facilitate discharge of the rolls 1005 and 1035, respectively, from the end of each manufacturing line.

Figure 11B:
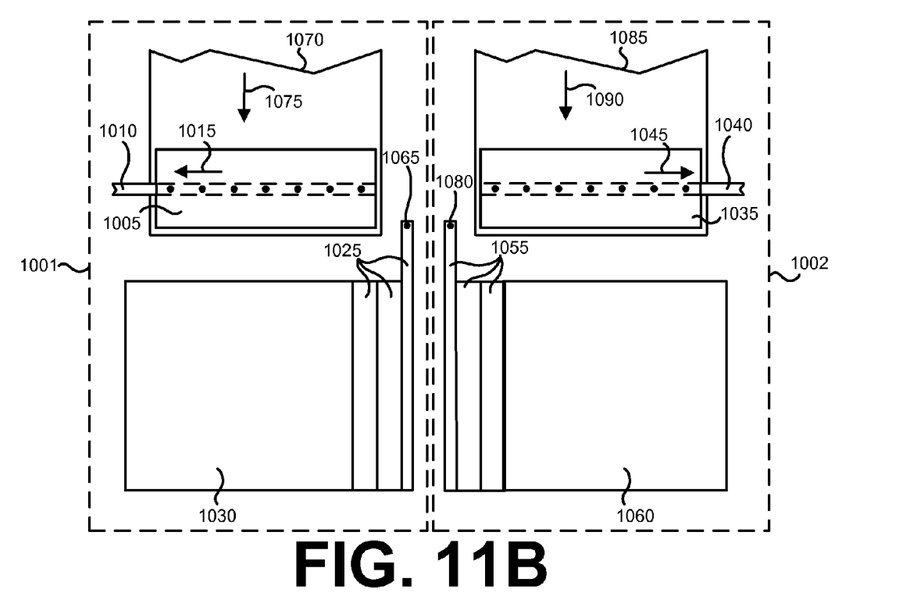
FIG. 11B is a plan view of the dual accumulation and discharge station in FIG. 10A.

FIG. 11B is a plan view of the dual accumulation and discharge station in FIG. 11A. As illustrated in FIG. 10B, the first bag accumulation and discharge station 1001 also includes a conveyer 1070 that is configured to move in a direction 1075. Additionally, FIG. 11B illustrates that the second accumulation and discharge station 1002 includes a conveyer 1085 that is configured to move in a direction 1090. FIG. 11B further illustrates a pivot point 1065 associated with the tray 1025, the pivot point 1065 allowing the tray to move between a catching position and a discharge position. Likewise, FIG. 11B illustrates a pivot point 1080 associated with the tray 1055 that permits the tray 1055 to move between a catching position and a discharge position.

FIGS. 11A and 11B thus highlight how two accumulation and discharge stations 1001 and 1002 can be disposed next to each other in a manufacturing facility. Such a layout may improve layout efficiencies compared to conventional bag manufacturing equipment that is configured to discharge a roll of bags to the side.

Figure 12A:
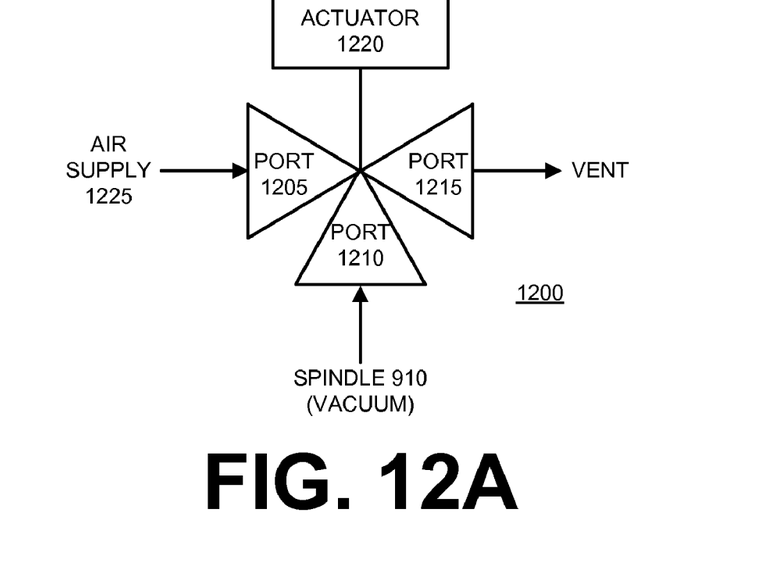
FIG. 12A is a schematic diagram of a pneumatic valve in a first mode, according to an embodiment of the invention.
Figure 12B:
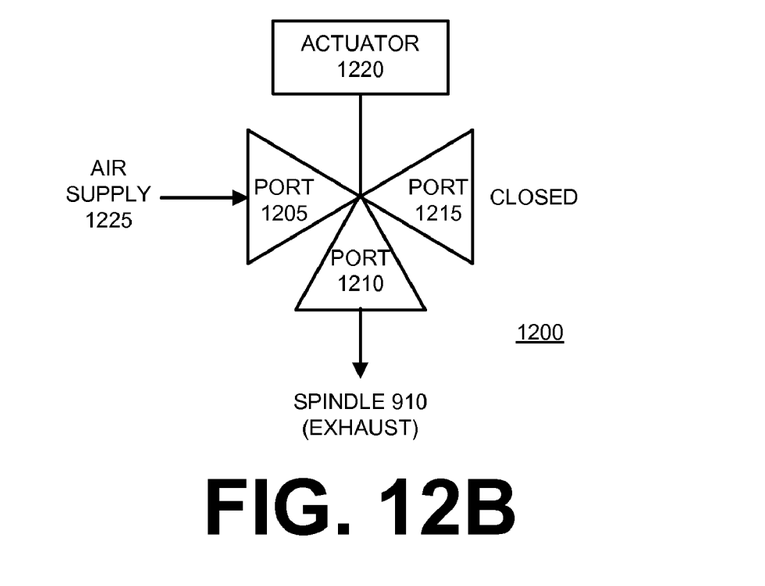
FIG. 12B is a schematic diagram of a pneumatic valve in a second mode, according to an embodiment of the invention.

FIGS. 12A and 12B illustrate a pneumatic valve 1200 that is coupled between an air supply 1225 and holes 912 in the spindle 910. The same valve 1200 could be used in conjunction with spindles 1010 and/or 1040.

FIG. 12A is a schematic diagram of a pneumatic valve in a first mode, according to an embodiment of the invention. As shown therein, the pneumatic valve 1200 includes ports 1205, 1210, and 1215. The valve 1200 further includes an actuator 1220 coupled to each of the ports 1205, 1210, and 1215. In the configuration illustrated in FIG. 12A, an air supply 1225 is coupled to the port 1205. A spindle 910 is coupled to the port 1210. Port 1215 is vented. In the configuration illustrated in FIG. 12A, a vacuum is created at the spindle 910. The configuration shown in FIG. 12A may be used, for instance, during accumulation step 140.

FIG. 12B is a schematic diagram of a pneumatic valve in a second mode, according to an embodiment of the invention. In the configuration illustrated in FIG. 12B, the exhaust port 1215 is in a closed position. Accordingly, an air supply 1225 at the port 1205 is exhausted at port 1210 to the spindle 910. The configuration illustrated in FIG. 12B may be used, for instance, during discharge step 145.

It will be apparent to those skilled in the art that modifications and variations can be made without deviating from the spirit or scope of the invention. For example, features described herein could be combined in ways not explicitly illustrated or disclosed. Thus, it is intended that the present invention cover any such modifications and variations of this invention provided they come within the scope of the appended claims and their equivalents.

I claim:
1. A bag manufacturing apparatus comprising:
   a cutting knife configured to cut a folded film;
   a first inside holding knife disposed proximate to the cutting knife on a first side of the cutting knife, the first inside holding knife configured to hold the folded film;

a second inside holding knife disposed proximate to the cutting knife on a second side of the cutting knife, the second inside holding knife configured to hold the folded film;

a contact welding bar configured to communicate with the folded film, the first inside holding knife being disposed between the contact welding bar and the cutting knife;

a first outside holding knife disposed proximate to the contact welding bar on a side opposite the first inside holding knife;

a second outside holding knife disposed proximate to the cutting knife on a side opposite the second inside holding knife;

an accumulation module including a spindle configured to accumulate a roll of interleaved bags during an accumulation mode, the spindle further configured to retract from the roll of interleaved bags along a long axis of the spindle during a spindle retraction mode, a surface of the spindle having a plurality of holes, the accumulation module configured to provide a vacuum at each of the plurality of holes during the accumulation mode, the accumulation module further configured to provide an exhaust at each of the plurality of holes during the spindle retraction mode;

a 3-way pneumatic valve having a first port, a second port, and a third port, the spindle coupled to the second port;

an actuator coupled to the 3-way pneumatic valve; and an air supply coupled to the first port, the actuator configured to switch the 3-way pneumatic valve between the accumulation mode and the spindle retraction mode.

2. The bag manufacturing apparatus of claim 1, the accumulation module further including a tray, the tray configured to communicate with the roll of interleaved bags during the spindle retraction mode.

3. The bag manufacturing apparatus of claim 2, the tray configured to rotate approximately 90 degrees with respect to the long axis of the spindle subsequent to operation of the spindle retraction mode.

* * * * *